United States Patent [19]

Gebhardt, deceased et al.

[11] 4,215,775

[45] Aug. 5, 1980

[54] ROLLER CONVEYOR FOR CONVEYING AND PRESSURE-FREE ACCUMULATION OF INDIVIDUAL ITEMS

[76] Inventors: Richard Gebhardt, deceased, late of Sinsheim, Fed. Rep. of Germany; by Elfriede Gebhardt, heiress, H. Thomastrasse 10, D-6920 Sinsheim, Fed. Rep. of Germany

[21] Appl. No.: 847,737

[22] Filed: Nov. 2, 1977

[30] Foreign Application Priority Data

Nov. 2, 1976 [DE]  Fed. Rep. of Germany ....... 2650205

[51] Int. Cl.² .............................................. B65G 13/06
[52] U.S. Cl. ................................... 198/781; 198/790; 198/791
[58] Field of Search ............... 198/460, 466, 467, 781, 198/789–791, 857

[56] References Cited

U.S. PATENT DOCUMENTS

| | | | |
|---|---|---|---|
| 2,602,536 | 7/1952 | Eggleston | 198/789 |
| 3,537,568 | 11/1970 | Leach | 198/857 |
| 3,905,470 | 9/1975 | Gebhardt | 198/781 |
| 3,934,707 | 1/1976 | Bowman | 198/460 |
| 4,006,815 | 2/1977 | Werntz | 198/781 |

FOREIGN PATENT DOCUMENTS 1481291  6/1974  Fed. Rep. of Germany ........... 198/781
2307728 11/1976  Fed. Rep. of Germany ........... 198/789

Primary Examiner—Joseph E. Valenza
Attorney, Agent, or Firm—Spencer & Kaye

[57] ABSTRACT

A roller conveyor for conveying items and permitting such items to accumulate in a pressure-free manner, including supporting rollers each having an associated jacket and hub, intermediate rollers each equipped with a sprocket wheel and each forming a driving connection with a respective supporting roller when in a driving position, an endless drive chain engaging all of the sprocket wheels, and a rod assembly provided with a sensor extending into the conveying path of the conveyor and arranged to move the intermediate rollers between their driving position and an idling position, and in which the connection between the jacket and hub of each supporting roller has the form of a slide bearing and the driving connection between each intermediate roller and its associated supporting roller is constituted by a flattened tooth arrangement.

13 Claims, 8 Drawing Figures

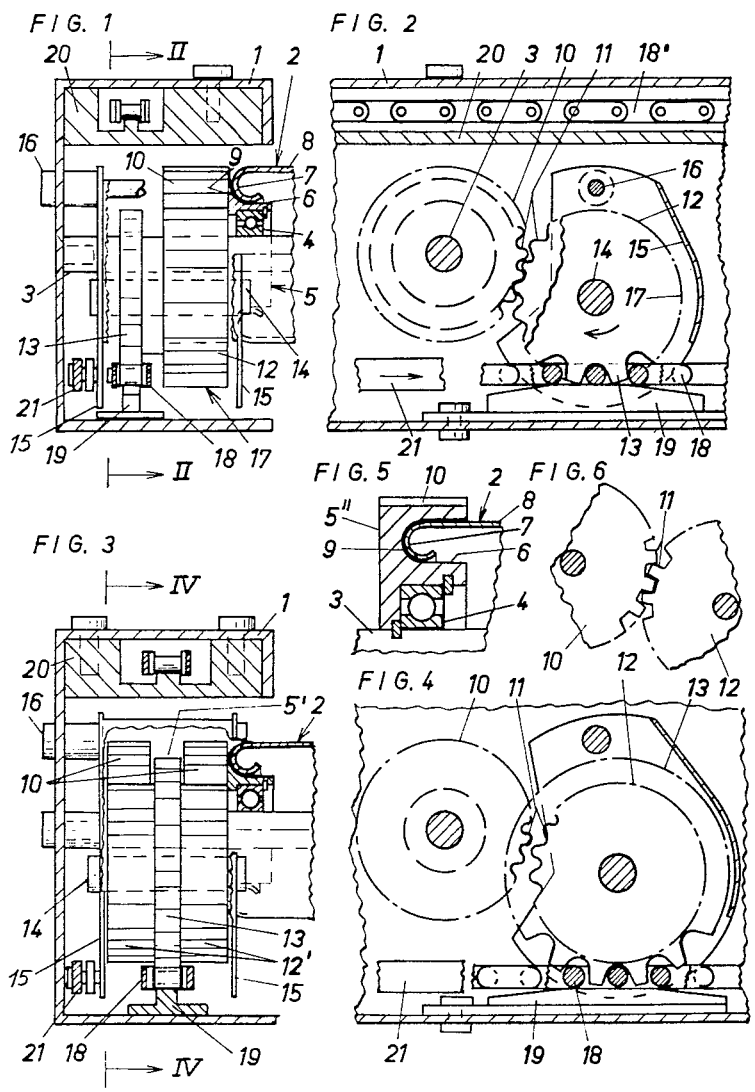

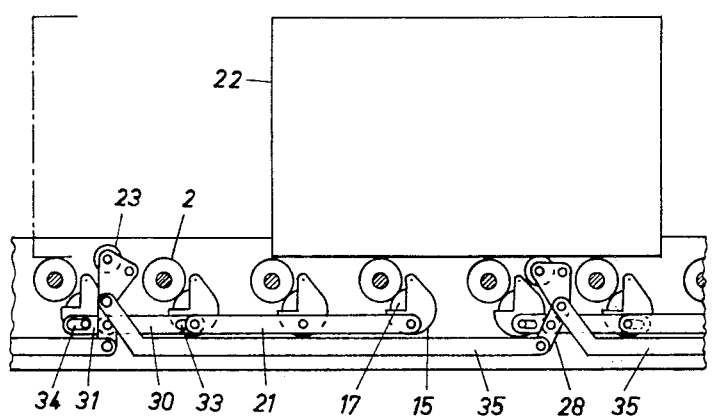
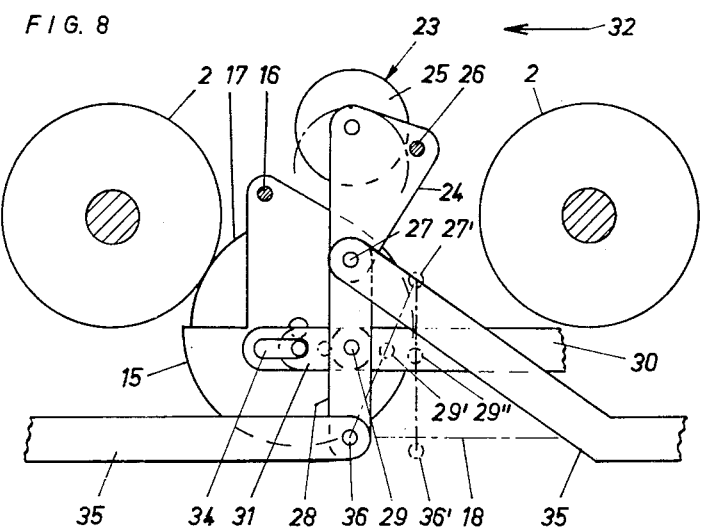

ROLLER CONVEYOR FOR CONVEYING AND PRESSURE-FREE ACCUMULATION OF INDIVIDUAL ITEMS

BACKGROUND OF THE INVENTION

The present invention relates to a roller conveyor for conveying individual items, particularly pallets, and for permitting such items to accumulate at the end of a conveying path without being subjected to pressure.

Conveyors of this type generally include supporting rollers to support the items, each of these rollers being driven by an intermediate roller equipped with a sprocket wheel which engages an endless chain. The intermediate roller can be placed into either a driving position or an idling position by a rod assembly which is provided with sensors extending into the path of the items.

German patent application No. P 25 17 015.4 discloses a conveyor for conveying and accumulating individual items, particularly pallets, in which the intermediate roller is provided with a sprocket wheel meshing with an endless chain. The drive wheel which can be brought into a driving connection with the supporting roller may also be designed as a sprocket wheel. This produces a doubly positively locking drive transmission which, on the one hand, assures in an advantageous manner safe and smooth movement of the items but, on the other hand, has the drawback that it continues to run even when an item is blocked so that there is a large waste of energy and the conveyor and/or the items may be damaged.

Difficulties also arise during coupling when the sprockets are brought into engagement. If engagement has been established, the supporting rollers start rotating with a jerk at the desired speed. This produces high load peaks in the drive system and jerky movements of the items so that lateral escape from the path, with items becoming jammed and falling off, is made possible.

The drive wheel may also be a friction wheel, in which case the establishment and release of the driving connection presents no problems. The drawback of this form of construction, however, is that the driving wheel continues to rotate when the supporting roller is blocked, resulting, due to the strong friction and the resulting heating of the rubber-like friction coating, in wear and destruction and consequently loss or reduction of drive output.

Since, in warehouse areas, the conveyor paths are arranged in close juxtaposition without provision of spaces therebetween, and at several levels on top of one another, it is difficult and expensive to control the numerous drive connections or to locate and replace a damaged part. Furthermore, the coefficient of friction of such a drive connection is greatly reduced by humidity and dust so that such conditions can cause movement of the items to be slowed down and even completely interrupted.

The fact that items often rest only partly on a single driven support roller hinders rapid acceleration of the items from a standstill. If the items are in insufficient contact with that supporting roller or if one of the above-described reductions in drive output exists, the items will not start moving. This results in a malfunction of the system with possible damage thereto.

Another known system is composed of accumulating roller conveyors with directly driven supporting rollers in which a slide coupling is provided between the driven wheel of the support roller and the roller jacket, which coupling slides through when items accumulate. Since the supporting rollers are being driven continuously, the coupling friction must also be continuously overcome. The larger the number of accumulated items, the greater is the amount of energy wasted. Moreover, the first item on each conveyor is also subjected to considerable accumulation pressures exerted by the subsequent items so that pressure damage may occur.

The known roller conveyors thus exhibit drawbacks which do not assure trouble-free continuous operation.

SUMMARY OF THE INVENTION

It is therefore an object of the present invention to make such accumulation roller conveyors more insensitive to malfunctions while simultaneously producing a high and constant drive energy transmission level.

These and other objects are accomplished according to the present invention by connecting the jacket of the supporting roller to its hub, which is driven by the intermediate roller, by means of a slide bearing, and by providing a flattened tooth configuration for the driving connection between the intermediate roller and the supporting roller.

According to a further feature of the invention, a particularly effective arrangement is produced by connecting each of the hub and the sprocket wheel with a wheel having such flattened teeth.

According to another feature of the invention, a high degree of driving energy transmission is assured by arranging the sensor within groups of intermediate rollers so that the items are stopped within this group of rollers and all supporting rollers underneath the items are driven at the start.

The advantages achieved by the present invention are in particular that the combination of a slide coupling and special tooth arrangement establishes dependable protection against overloads with an easily engageable and disengageable positively locking driving force transmission. The sliding coupling, or slide bearing, can run in the overload range practically without limit, i.e. with a stationary roller jacket. The teeth of the flattened tooth arrangement easily mesh, producing a positive connection while in engagement. The control of the intermediate rollers therefore requires very low controlling forces and can be accomplished easily.

In order to assure smooth starts for the items in spite of the slide bearing with its inevitably limited translationary moment, all supporting rollers underneath the items are immediately coupled to the pulling means and are driven. Likewise the control rod assembly and its appropriate decoupling always assure stoppage of the items in the range of one group of rollers. The roller conveyor is thus insensitive to stoppages in the conveying flow produced by an item or parts thereof.

The items are also accelerated smoothly independently of the degree of humidity and dust in the environment and possibly soiling of the transmission wheels from other sources.

Finally, the intermediate rollers can be easily adjusted so that the control is effective with sensitivity and without requiring much energy. The roller conveyor according to the invention can therefore be used in many cases with great operational dependability.

BRIEF DESCRIPTION OF THE DRAWINGS

FIG. 1 is a cross-sectional, elevational view of a portion of a preferred embodiment of a roller conveyor according to the invention.

FIG. 2 is a cross-sectional view along line II—II of FIG. 1.

FIG. 3 is a cross-sectional elevational view similar to that of FIG. 1 of another preferred embodiment of the invention.

FIG. 4 is a cross-sectional view along line IV—IV of FIG. 3.

FIG. 5 is a cross-sectional detail view of a supporting roller drive of conveyors according to the invention.

FIG. 6 is a detail view of one form of tooth arrangement for a drive connection.

FIG. 7 is an elevational side view of the roller conveyor path of embodiments of the invention.

FIG. 8 is an elevational, detail view to an enlarged scale of a portion of the structure of FIG. 7, showing the adjustment of an intermediate roller.

DESCRIPTION OF THE PREFERRED EMBODIMENTS

Referring to the common features of FIGS. 1 and 2 and FIGS. 3 and 4, a roller conveyor for conveying, and pressure-free accumulation of, individual items, particularly pallets, includes two laterally-spaced parallel frames, one of which, the frame 1, is shown. Supporting rollers 2 are rotatably mounted between the two frames. Items to be conveyed rest on these supporting rollers 2. At least the frame 1, at the drive side of the conveyor, is given a U shape so that the entire drive arrangement is accommodated within the U profile. Each supporting roller 2 is mounted on a continuous shaft 3 which is screwed, or otherwise fixed, at both ends to the frames. Pushed onto this shaft 3 near each end is a roller bearing 4 provided with a hub 5, e.g. of plastic.

At the drive side of the conveyor, which is the side shown in FIGS. 1-4, hub 5 is provided with a cylindrical portion 6 onto which is pushed the inwardly flanged lateral edge 7 of jacket 8 of the supporting roller 2. With appropriate selection of materials, e.g. a metal jacket on a plastic hub, edge 7 and cylindrical portion 6 form a slide bearing 9 which, on the one hand, transmits torque forces to jacket 8 due to the friction between edge 7 and cylindrical portion 6 and, on the other hand, is capable of producing a continuous rotary sliding of portion 6 relative to edge 7 practically indefinitely if there is a resistance to advancement of the items.

According to FIGS. 1 and 2, a toothed, or gear, wheel 10 with flattened teeth 11, e.g. in which the teeth follow a sinuous path around the wheel circumference or have a height reduced with respect to normal teeth, as shown in FIG. 6, is arranged coaxially with, and secured to, hub 5 so as to establish secure engagement during coupling as well as a tight, positive-locking fit during the transmission of driving power. Associated with toothed wheel 10 is a counter wheel 12 which is permanently fixed to a sprocket wheel 13 and which is provided with teeth 11 formed to mate with teeth 11 on wheel 10.

Counter toothed wheel 12 and sprocket wheel 13 together define an intermediate roller 17 and are mounted for rotation about a shaft 14 in a housing 15. Housing 15 is mounted on a shaft 16 fastened to frame 1 so that the housing can pivot about the axis of that shaft and the flattened teeth 11 of the counter toothed wheel 12 can be brought into or out of engagement with the flattened teeth 11 of toothed wheel 10, corresponding to the driving and idling positions, respectively, of the intermediate roller 17.

In both of those positions, sprocket wheel 13 remains continuously in engagement with an endless drive chain 18 which is advanced underneath sprocket wheel 13 from the right to the left, with reference to the view of FIGS. 2 and 4, by a conventional drive (not shown) so that sprocket wheel 13 rotates clockwise, as indicated by the arrow in FIG. 2. When roller 17 is in the driving position shown in FIG. 2, an item resting on supporting roller 2 will thus be moved toward the left.

Below sprocket wheel 13, chain 18 rests on a slide guide 19 while the return reach 18' of the chain, which travels above intermediate roller 17, is supported on supporting elements made, for example, of plastic and visible in FIGS. 1 and 3.

A complete conveyor includes, of course, a plurality of the arrangements of FIGS. 1 and 2 or 3 and 4, and in order to move groups of intermediate rollers 17, between their driving and idling positions, a rod assembly 21 is provided which is articulated to each housing 15 of the group and is connected with a respective sensor 23 normally extending into the path of items 22, as shown in FIGS. 7 and 8. Sensor 23 includes a roller 25 rotatably mounted on a pivot lever 24. Pivot lever 24 is pivotal about an axis 26 fixed to frame 1, so as to permit roller 25 to move in a downward direction. Below axis 26 an intermediate lever 28 is articulated to pivot lever 24 by means of a bolt, pin, or rivet 27, intermediate lever 28 being provided with a further bolt or pin 29 in its center.

As can best be seen in FIG. 8, each intermediate lever is associated with a rod 30 pivotally connected at one end to bolt 29 and extending counter to the transporting direction 32 and with a rod 31 pivotally connected to bolt 29 and extending in the transporting direction 32. The end of rod 30 remote from bolt 29 is provided with an elongated slot 33 via which it is connected with the rod assembly 21 and with the next housing 15 of its group. Rod 31 is provided with an elongated slot 34 which is identical with slot 33 and via which rod 31 is connected with the housing 15 of the intermediate roller 17 disposed ahead, or downstream, of sensor 23 in the transporting direction 32.

Bolt 27 is also connected to one end of a connecting rod 35 which extends counter to the transporting direction 32 to the lower end of the adjacent upstream intermediate lever 28, where it is there articulated by means of bolt, pin, or rivet 36.

Normally, sensor 23 is in its raised position, shown at the left side of FIG. 7 and in solid lines in FIG. 8, in which roller 25 intercepts the path of the items 22. All intermediate rollers 17 are in their driving position in which the advancing movement of the chain 18 is transmitted to the supporting rollers 2, i.e. the supporting rollers 2 rotate and transport the items 22 in the transporting direction 32. If an item 22 rolls over roller 25, pivot lever 24 will pivot counterclockwise and bolt 27 will take on position 27' shown in FIG. 8. Since rod 35 is not then being moved, the intermediate lever 28 pivots clockwise about bolt 36 into the inclined position shown by a dot-dash line between bolt 36 and position 27'. This causes bolt 29 to move to position 29', the length of the path from the initial position 29 to position 29' corresponding to the length of elongated holes 33 and 34, so that the intermediate rollers of the group under consideration remain in their driving position.

If one item 22 has already stopped, it will keep the sensor 23 upon which it rests in its compressed position, which corresponds in FIG. 8 to the dot-dash position of roller 25 and the position 27' of bolt 27. Movement of bolt 27 into position 27' moves the rod 35 which is connected to bolt 27 counter to the direction of movement 32 so that the bolt 36 at the other end of that rod 35, and associated with the adjacent upstream intermediate lever 28 moves into position 36'. If an item 22 is not then resting on roller 25 of the sensor of that adjacent upstream group, bolt 29 of the latter sensor then takes on its position 29' in which the drive for the connected group of rollers is not yet interrupted. If now an item 22 has reached the sensor 23 of this adjacent upstream group of rollers and presses it downwardly, the additional movement of its associated bolt 27 into its position 27' causes the associated bolt 29 to be moved from its position 29' to its position 29''. Since the play permitted by elongated slots 33 and 34 has already been overcome, this additional movement causes the intermediate rollers 17 of this adjacent upstream group to be pivoted counterclockwise by their associated rods 21, 30 and 31 from the driving to the idling position and thus the drive for this group of rollers is interrupted. The item 22 stops rolling and comes to a standstill, its front end still lying on the supporting roller 2 which is part of the just disconnected group of rollers, in the position shown in dot-dash lines in FIG. 7.

If an item which has been depressing a roller 25 clears that roller, the bolt 36 of the adjacent upstream group moves back from position 36' into its starting position and thus bolt 29 moves from position 29'' to position 29', assuming roller 25 of the adjacent upstream group is still depressed, in which position all intermediate rollers 17 of the connected group of rollers return to the driving position. All supporting rollers 2 underneath the item 22 are driven in this way.

Thus, the position of each group of intermediate rollers is controlled by a combination of the operating states of its associated sensor and of the sensor associated with the adjacent downstream group.

Reverting to FIGS. 1–4, the slide bearings 9 soften the driving shocks and, on the other hand, the large number of supporting rollers 2 produces smooth acceleration. If an item 22 should jam, the slide bearings 9 of the affected supporting rollers will continue turning without stressing the drive system in an undue manner.

In the embodiment of FIGS. 1 and 2, sprocket wheel 13 of intermediate roller 17 is disposed axially next to toothed wheel 10. In order to realize uniform loads, the sprocket wheel 13 of FIGS. 3 and 4 is arranged in the center of counter toothed wheel 12, between two halves thereof. Correspondingly, the toothed wheel 10' of hub 5 is provided with an annular groove 5' in its center into which sprocket wheel 13 engages.

According to a further embodiment shown in FIG. 5, the toothed wheel 10, slide bearing 9 and roller bearing 4 are arranged in a common radial plane so that a single roller bearing 4 is sufficient to support hub 5'' and wheel 10 at the drive side of the conveyor. Naturally the flattened tooth arrangement 11 can be given a different shape to assure the desired easy engagement with a high degree of positive locking.

In preferred forms of construction of various embodiments of the invention, each hub 5 and its associated wheel 9 can be made as a one-piece plastic member, as can each toothed wheel 12 and its associated sprocket wheel 13.

It will be understood that the above description of the present invention is susceptible to various modifications, changes and adaptations, and the same are intended to be comprehended within the meaning and range of equivalents of the appended claims.

What is claimed is:

1. In a roller conveyor for conveying items along a conveying path and permitting such items to accumulate in a pressure-free manner, which conveyor includes supporting rollers each composed of a jacket and hub, intermediate rollers each equipped with a sprocket wheel and each arranged to drive a respective supporting roller when in a driving position, an endless drive chain engaging all of the sprocket wheels, and a rod assembly provided with a sensor extending into the conveying path of the conveyor and arranged to move a group of the intermediate rollers between their driving position and an idling position, the improvement wherein said jacket and hub of each said supporting roller together define a slide bearing via which drive power is transmitted from said hub to said jacket, each said supporting roller and its respective intermediate roller together comprise drive means defining a flattened tooth connection via which said intermediate roller drives said supporting roller, there are a plurality of groups of said intermediate rollers, each said intermediate roller being associated with a respective supporting roller, said groups being spaced along the conveying path defined by said conveyor, there are a plurality of said rod assemblies each provided with a respective sensor and each associated with a respective group of intermediate rollers, each said rod assembly comprises: an intermediate lever having one end pivotally connected to said sensor of its associated rod assembly; a connecting rod pivotally connected between the other end of said intermediate lever and said sensor of said rod assembly associated with the adjacent group of intermediate rollers located downstream along said conveying path; and rods pivotally connected to said intermediate lever at a point between its ends and provided with elongated slots via which said rods are coupled to said intermediate rollers of said associated group, each said sensor is located in the region occupied by its associated group of intermediate rollers for causing an item to stop in such region when said intermediate rollers of its associated group are moved to their idling position, and each said sensor causes its associated rod assembly to normally maintain said intermediate rollers of its associated group in their driving position.

2. An arrangement as defined in claim 1 wherein said drive means for each said supporting roller and its associated intermediate roller comprise a first toothed wheel connected to said hub of said supporting roller and a second toothed wheel connected to said sprocket wheel of said intermediate roller, each said toothed wheel having flattened teeth formed to mesh with those on said other toothed wheel when said intermediate roller is in its driving position.

3. An arrangement as defined in claim 2 wherein said first toothed wheel is integral with said hub and said second toothed wheel is integral with said sprocket wheel.

4. An arrangement as defined in claim 3 wherein said first toothed wheel and said hub are together constituted by a one-piece plastic member, and said second toothed wheel and said sprocket wheel are together constituted by a one-piece plastic member.

5. An arrangement as defined in claim 3 wherein said hub of each said supporting roller presents an axially extending cylindrical surface defining part of said slide bearing and said jacket of each said supporting roller is provided with an inwardly flanged lateral edge which is pushed over said cylindrical surface of its associated hub and which defines a second part of said slide bearing.

6. An arrangement as defined in claim 3 wherein said second toothed wheel of each said intermediate roller is composed of two axially-spaced parts between which said sprocket wheel of its associated intermediate roller is disposed, and said first toothed wheel of each said supporting roller is provided with an annular groove into which extends said second toothed wheel of its associated intermediate roller.

7. An arrangement as defined in claim 3 further comprising a support shaft for each said supporting roller, a roller bearing mounting said supporting roller on its associated shaft, and wherein each said roller bearing, first toothed wheel and slide bearing of a respective supporting roller are located substantially in a common radial plane.

8. An arrangement as defined in claim 2 wherein said flattened teeth on each said toothed wheel are formed to present a sinuous curve extending around the circumference of said toothed wheel.

9. An arrangement as defined in claim 2 wherein said flattened teeth on each said toothed wheel are made similar to normal gear teeth but with a reduced tooth height.

10. An arrangement as defined in claim 1 wherein each said sensor comprises a pivot lever pivotally mounted on a fixed axis and a roller rotatably mounted on said pivot lever at a point spaced from said fixed axis, and said one end of said intermediate lever is pivotally connected to said sensor by being pivotally connected to said pivot lever at a point spaced from said fixed axis and from said point at which said roller is rotatably mounted.

11. An arrangement as defined in claim 1 wherein said sensor of each said rod assembly is located between successive intermediate rollers of said group of intermediate rollers of the associated rod assembly.

12. In a roller conveyor for conveying items along a conveying path and permitting such items to accumulate in a pressure-free manner, which conveyor includes supporting rollers each composed of a jacket and hub, intermediate rollers each equipped with a sprocket wheel and each arranged to drive a respective supporting roller when in a driving position, an endless drive chain engaging all of the sprocket wheels, and a rod assembly provided with a sensor extending into the conveying path of the conveyor and arranged to move a group of the intermediate rollers between their driving position and an idling position, the improvement wherein said jacket and hub of each said supporting roller together define a slide bearing via which drive power is transmitted from said hub to said jacket, and each said supporting roller and its respective intermediate roller together comprise drive means via which said intermediate roller drives said supporting roller, said drive means for each said supporting roller and its associated intermediate roller being composed of a first toothed wheel integral with said hub of said supporting roller and a second toothed wheel integral with said sprocket wheel of said intermediate roller, each said toothed wheel having flattened teeth formed to mesh with those on said other toothed wheel when said intermediate roller is in its driving position, said second toothed wheel of each said intermediate roller being composed of two axially-spaced parts between which said sprocket wheel of its associated intermediate roller is disposed, and said first toothed wheel of each said supporting roller being provided with an annular groove into which extends said second toothed wheel of its associated intermediate roller.

13. In a roller conveyor for conveying items along a conveying path and permitting such items to accumulate in a pressure-free manner, which conveyor includes supporting rollers each composed of a jacket and hub, intermediate rollers each equipped with a sprocket wheel and each arranged to drive a respective supporting roller when in a driving position, an endless drive chain engaging all of the sprocket wheels, and a rod assembly provided with a sensor extending into the conveying path of the conveyor and arranged to move a group of the intermediate rollers between their driving position and an idling position, the improvement wherein said jacket and hub of each said supporting roller together define a slide bearing via which drive power is transmitted from said hub to said jacket, each said supporting roller and its respective intermediate roller together comprise drive means via which said intermediate roller drives said supporting roller, said drive means for each said supporting roller and its associated intermediate roller being composed of a first toothed wheel integral with said hub of said supporting roller and a second toothed wheel integral with said sprocket wheel of said intermediate roller, each said toothed wheel having flattened teeth formed to mesh with those on said other toothed wheel when said intermediate roller is in its driving position, said conveyor further comprises a support shaft for each said supporting roller and a roller bearing mounting said supporting roller on its associated shaft, and each said roller bearing, first toothed wheel and slide bearing of a respective supporting roller are located substantially in a common radial plane.

* * * * *